(12) United States Patent
Huber et al.

(10) Patent No.: US 6,219,259 B1
(45) Date of Patent: Apr. 17, 2001

(54) METHOD AND CIRCUIT ARRANGEMENT FOR ADAPTING THE INTERMEDIATE CIRCUIT VOLTAGE TO THE SUPPLY VOLTAGE

(75) Inventors: Norbert Huber, Teisendorf; Franz Ritz, Übersee, both of (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/457,252

(22) Filed: Dec. 8, 1999

(30) Foreign Application Priority Data

Dec. 8, 1998 (DE) ............................... 198 56 551

(51) Int. Cl.[7] ............................. H02M 5/45; H02M 1/12; H02M 1/14; H02H 7/122
(52) U.S. Cl. ............................. 363/37; 318/254; 363/56; 363/41
(58) Field of Search ..................... 318/254; 363/37, 363/35, 56, 53, 39, 40, 41, 45, 46

(56) References Cited

U.S. PATENT DOCUMENTS

| | | | |
|---|---|---|---|
| 4,328,454 | 5/1982 | Okuyama et al. | 363/37 |
| 4,375,612 * | 3/1983 | Wirth | 363/37 |
| 4,670,827 * | 6/1987 | Schneider | 363/48 |
| 5,349,517 * | 9/1994 | Brennen | 363/40 |
| 5,355,295 * | 10/1994 | Brennen | 363/40 |
| 5,903,138 * | 5/1999 | Hwang et al. | 323/266 |
| 6,002,596 * | 12/1999 | Mayer et al. | 363/21 |
| 6,005,362 * | 12/1999 | Enjeti et al. | 363/37 |
| 6,078,162 * | 6/2000 | Hohmuth | 318/800 |

FOREIGN PATENT DOCUMENTS

| | | | |
|---|---|---|---|
| 30 21 119 * | 6/1980 | (DE) . | |
| 3021 063 | 12/1981 | (DE) | B23Q/5/28 |
| 36 01 160 | 10/1987 | (DE) | H02H/7/122 |
| 41 20 611 | 12/1993 | (DE) | H02P/7/63 |
| 43 22 379 | 12/1994 | (DE) | H02M/7/68 |
| 0 193 775 | 9/1986 | (EP) | H02M/7/757 |
| 60066675 | 9/1993 | (JP) | H02M/7/48 |

* cited by examiner

Primary Examiner—Peter S. Wong
Assistant Examiner—Bao Q. Vu
(74) Attorney, Agent, or Firm—Kenyon & Kenyon

(57) ABSTRACT

A circuit arrangement allows a converter to be operated with supply voltages oscillating within broad limits. The intermediate circuit voltage of the converter is controlled to avoid unacceptably high currents, so that the intermediate circuit voltage is always higher than the peak value of the rectified supply voltage. For at least this purpose, the peak value of the rectified supply voltage is determined and compared to that of the intermediate circuit voltage. If the intermediate circuit voltage is less than the peak value of the rectified supply voltage, the intermediate circuit voltage is increased to exceed the originally set setpoint value. This prevents free-wheeling diodes from becoming conductive at undesirable times and causing excessive currents.

2 Claims, 5 Drawing Sheets

METHOD AND CIRCUIT ARRANGEMENT FOR ADAPTING THE INTERMEDIATE CIRCUIT VOLTAGE TO THE SUPPLY VOLTAGE

FIELD OF THE INVENTION

The present invention relates to a method and a circuit arrangement for adapting an intermediate circuit voltage to a supply voltage.

BACKGROUND INFORMATION

Japanese Patent Application No. 60066675 describes that when a converter is overloaded, the intermediate circuit voltage increases. As soon as the maximum allowable current or a higher current is output by the converter, an overload detector is activated and the DC voltage in the intermediate circuit is increased.

Japanese Patent Application No. 60066675 does not describe adapting the DC voltage to the supply voltage.

German Published Patent Application No. 30 21 119 describes a power inverter circuit for operating a variable-speed asynchronous motor. In this circuit, the frequency at which the asynchronous motor is controlled is increased to counteract the overvoltages that occur in the generator mode operation of the asynchronous motor or in the voltage supply system and the resulting excessively high currents.

This procedure has a disadvantage that, in increasing the frequency at which the asynchronous motor is operated, its speed increases. Thus speed regulation, which must be continuously available for many applications, can no longer be performed in the event of overvoltages.

German Patent No. 36 01 160 describes a control procedure for a frequency converter for starting, varying speed, braking, and positioning of three-phase asynchronous motors. The frequency converter has a three-phase or AC current converter and a smoothing capacitor as the intermediate circuit, and a downstream three-phase bridge circuit containing power transistors and an associated pulse width modulator to convert the intermediate circuit voltage into an AC voltage with adjustable frequency and amplitude. The transistors in the power inverter are blocked by a contactor circuit after the limit voltage is exceeded in the intermediate circuit. Thus, the power flow is interrupted in the power inverter and the voltage in the intermediate circuit is reduced due to the power consumption. After the intermediate circuit voltage has been reduced to less than the turn-off limit voltage, the power transistors are made conductive again. In the switch-off phase, the control frequency of the power transistors is considerably reduced and, when the power is turned on again, the power transistors are turned on at a lower frequency.

A disadvantage of this procedure is that when the supply voltage is excessively high, the power transistors are constantly turned on and off, which results in a constantly fluctuating output power of the motors connected. This non-continuous motor operation does not allow the operating conditions required by most applications to be achieved. Furthermore, high electromagnetic interference fields are generated by the constant switching of high currents, which require additional shielding; this represents a high level of stress on the power transistors, so that they break down more often.

German Patent No. 41 20 611 describes a method of limiting the intermediate circuit voltage of an intermediate voltage circuit converter that supplies a variable speed three-phase drive. It has an excitation limiter, which limits the current in the generator mode so that the intermediate circuit voltage does not exceed a certain value. Furthermore, an effective current setpoint value is defined through which the intermediate circuit voltage is kept at a sufficiently high value in the event of line failure. A higher-level speed controller defines the effective current setpoint value, which is blocked in the event of a line failure. In the generator mode, a first upper value and, in the event of a line failure, a second lower value are supplied to the excitation limiter as setpoint values for the intermediate circuit voltage.

A disadvantage of this method is that only in the generator mode and in the event of a line failure is the intermediate circuit voltage controlled. If an excessive line voltage occurs, no control measures are taken to ensure proper operation of the load connected to the converter.

German Patent No. 43 22 379 describes a circuit arrangement for protecting semiconductor switches when a line-controlled line power converter bridge, which feeds the recovered power back to the line, becomes conductive. This circuit arrangement makes it possible to short circuit the intermediate circuit-side output of the line power converter bridge in the event of an overcurrent in the line or an overcurrent flowing through the line power converter bridge, using a short-circuit thyristor. Thus, the voltage of the intermediate circuit can be reduced, so that an overcurrent in the line power converter bridge caused by a line overvoltage can be eliminated.

A disadvantage of this method is that very high currents, which are caused by overvoltage in the line and which can be considered an ideal current source, flow through the short-circuit thyristor. If an overvoltage is permanently present in the line, a current causing overheating and a fire hazard will permanently flow through the short-circuit thyristor. Furthermore, this causes an overload in the line power converter bridge, since, in addition to the current needed in the power inverter for the load, the current flowing through the short-circuit thyristor must also be rectified.

Power-recovering converters with DC voltage intermediate circuits convert a polyphase (in particular, three-phase) supply voltage having a fixed frequency into a constant intermediate circuit DC voltage using semiconductor switches and commutation reactors, and then into a three-phase supply voltage with adjustable frequency for the motor to be controlled, using a power inverter. A problem is that in the event of overvoltage in the voltage supply, the DC voltage of the intermediate circuit is increased in an unacceptable manner due to the conversion of the supply voltage by the free-wheeling diodes. In this case, the semiconductor switches, which are controlled to set the constant intermediate circuit voltage, feed the intermediate circuit overvoltage back into the voltage supply system, which may cause unacceptably high currents and subsequent damage.

SUMMARY OF THE INVENTION

An object of the present invention is to provide a method through which unacceptably high currents in the converter, which occur in the event of overvoltage in the voltage supply system, are avoided as much as possible, even if the supply voltage externally applied to the converter fluctuates considerably beyond the allowable bandwidth. Furthermore, a circuit arrangement according to the present invention that includes changes in conventional converters is provided to implement the method. The circuit arrangement should also be implemented at the lowest possible cost.

The method according to the present invention provides an advantage in that the intermediate circuit voltage is controlled as a function of the supply voltage in such a way that the intermediate circuit voltage is always greater than the rectified supply voltage, so that no unacceptably high currents are present. Thus, the same converters can be used for different supply voltages of different voltage supply systems since the intermediate circuit voltage is automatically adapted to the supply voltage. This also reduces the manufacturing and inventory requirements.

DETAILED DESCRIPTION

In the following it is assumed that the method according to the present invention is used for a converter to which a three-phase alternate voltage having a constant frequency is supplied from a voltage supply system, and which outputs a three-phase alternate voltage having a variable frequency for a load, in particular, an electric motor.

Figure 3:
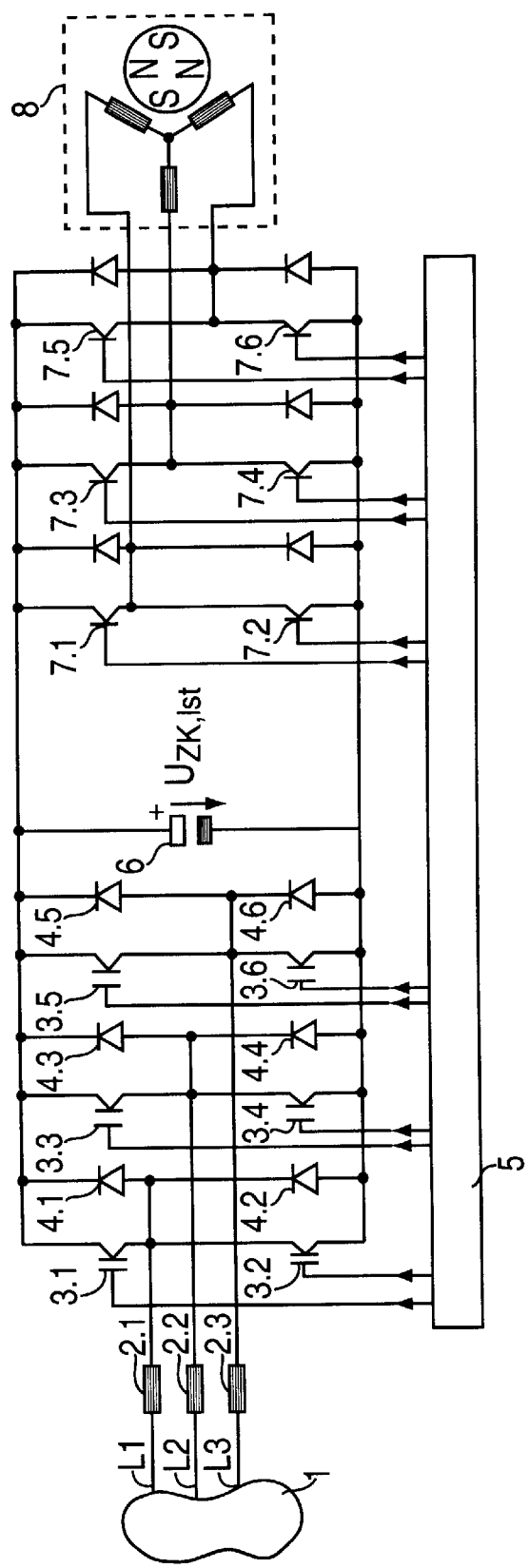
FIG. 3 shows a converter.

According to FIG. 3, a conventional converter has one commutation reactor 2.1, 2.2, and 2.3 for each of the three phases L1, L2, and L3 of voltage supply system 1. The output signals of each of commutation reactors 2.1, 2.2, and 2.3 are supplied to switching transistors 3.1, 3.2; 3.3, 34; and 3.5, 3.6, one of the two switching transistors being operated in an emitter circuit and the other in a collector circuit. Thus, the outputs of commutation reactors 2.1, 2.2, and 2.3 of the three phases L1, L2, and L3 can be optionally connected to a pole of a capacitor 6. Switching transistors 3.1 through 3.6 are controlled via their base terminals, which are connected to a control device 5. Control device 5 switches switching transistors 3.1 through 3.6 into a conducting or blocking state so that the intermediate circuit $U_{ZK,ist}$ has a constant, predefined value, which is as independent of the load as possible.

The total of six switching transistors 3.1 through 3.6 are connected in parallel with six free-wheeling diodes 4.1 through 4.6, which conduct the current of commutation reactors 2.1, 2.2 into the intermediate circuit, and 2.3 after the respective switching transistors 3.1 through 3.6 are turned off, taking into account the correct poles. The output signals of the six switching transistors 3.1 through 3.6 and six freewheeling diodes 4.1 through 4.6 are connected through capacitor 6 of the intermediate circuit, which is used to smooth intermediate circuit voltage $U_{ZK,ist}$. An electrolyte capacitor having as high a capacitance as possible is preferably used as capacitor 6.

The DC voltage thus produced in the intermediate circuit is then converted, in a power inverter, into the required control signals, preferably for an electric motor. For this purpose, the power inverter has six power transistors 7.1 through 7.6, which supply the required three-phase currents and voltages to load 8, which is preferably an electric motor. Power transistors 7.1 through 7.6 are controlled by a control device 5, which determines the control signals for power transistors 7.1 through 7.6, depending on the desired operating parameters of load 8. Power transistors 7.1 through 7.6 are preferably implemented as IGBTs, MCTs or Darlington circuits.

Figure 4:
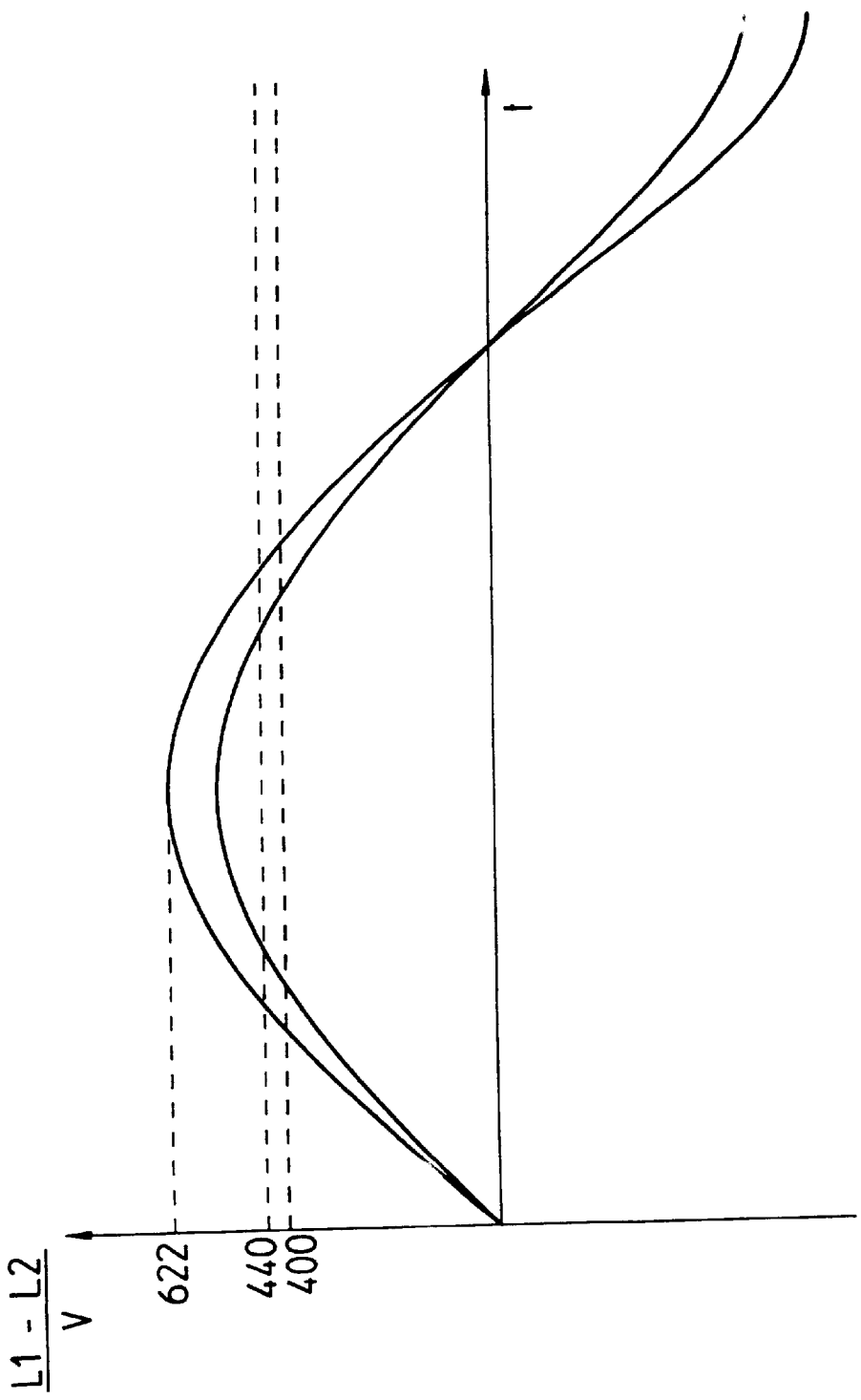
FIG. 4 shows an example of a voltage curve of the supply voltage supplied by a voltage supply system.

Voltage supply system 1 has, as shown as an example for phase L1 in FIG. 4, a sinusoidal voltage having an effective value of 400 V, which should not exceed a maximum deviation of ±10%, so that a maximum sinusoidal voltage of 440 V may occur. If intermediate circuit DC voltage $U_{ZK,ist}$ is then set at a higher peak value than the maximum allowable rectified voltage UN of the 622 V supply voltage (622 V=400 V*1.1*√2) of this effective voltage by transistors 3.1 through 3.6, no problems occur as long as the effective value of 440 V is not exceeded.

However, if an overvoltage that is higher than 440 V occurs in voltage supply system 1, the negative and positive voltage peaks of the sinusoidal voltage are switched through by free-wheeling diodes 4.1 through 4.6 to the intermediate circuit, since the peak voltage delivered by voltage supply system 1 is then greater than the DC voltage of the intermediate circuit, which results in free-wheeling diodes 4.1 through 4.6 switching through. This in turn results in an increase in intermediate circuit voltage $U_{ZK,ist}$. At the same time, control unit 5 attempts to keep intermediate circuit voltage $U_{ZK,ist}$ constant at 622 V and controls transistors 3.1 through 3.6 so that the now increased DC voltage is conducted to another phase of voltage supply system 1, which has no peak voltage at the time.

Thus the peak voltage is recovered into voltage supply system 1, resulting in an unacceptably high current, since a first phase of voltage supply system 1 is connected to a second phase via at least one of free-wheeling diodes 4.1 through 4.6 and one of transistors 3.1 through 3.6 without a load connected between them. This unacceptably high current results at least in considerable temperature increase in the converter. Without additional protective measures, fire hazard or converter failure due to damaged semiconductors may occur in extreme cases.

Figure 1:
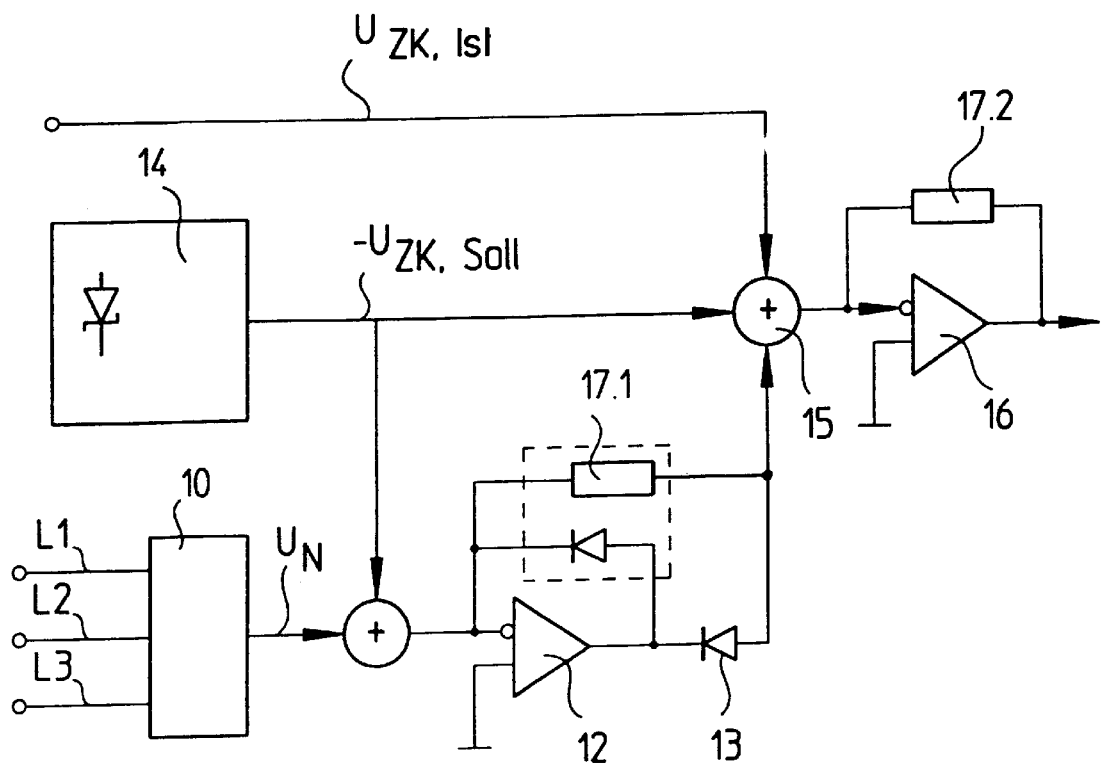
FIG. 1 shows an embodiment of an intermediate circuit voltage controller according to the present invention.

To avoid this, according to the present invention, intermediate circuit voltage $U_{ZK,ist}$ is adapted to the supply voltage delivered by voltage supply system 1, i.e., its rectified peak value $U_N$. FIG. 1 shows a possible controller arrangement for adapting intermediate circuit voltage $U_{ZK,ist}$ to the supply voltage, so that intermediate circuit voltage $U_{ZK,ist}$ is always greater than the rectified value of supply voltage $U_N$. This prevents free-wheeling diodes 4.1 through 4.6 from becoming conductive due to an excessive supply voltage, which would result in excessive current. The controller arrangement according to FIG. 1 has a rectifier 10, which rectifies the supply voltage of the three phases L1, L2, L3 delivered by voltage supply system 1. The peak value of the rectified supply voltage $U_N$ is added to the negative setpoint value of the intermediate circuit voltage $U_{ZK,soll}$, which is generated by a reference voltage generator 14, and the sum is supplied to an inverting input of an operational amplifier 12. The output signal of operational amplifier 12 is supplied to a diode 13, which is only conductive for negative output signals of operational amplifier 12; otherwise it blocks. The output signal of diode 13 is added to the negative setpoint value of the intermediate circuit voltage $-U_{ZK,soll}$ generated by reference voltage generator 14 and to the actual intermediate circuit voltage $U_{ZK,ist}$ in adder 15. The sum signal thus obtained is supplied to the inverting input of another operational amplifier 16, whose output signal is supplied to control device 5, which controls transistors 3.1 through 3.6 to set intermediate circuit voltage $U_{ZK,ist}$. Feedback modules 17.1 and 17.2 are needed to set the operating range of operational amplifiers 12 and 16 and ensure their stability in the relevant operating range.

As soon as an overvoltage is supplied to the rectifier according to the present invention by voltage supply system 1, the peak value of rectified supply voltage UN increases, so that the signal supplied to the inverting input of operational amplifier 12 becomes more positive and its output signal becomes more negative. Since diode 13 is blocked for a positive output signal of operational amplifier 12, it now becomes conductive and the signal output by adder 15 to the inverting input of operational amplifier 16 becomes more negative. Thus the signal output by operational amplifier 16 increases. Thereupon control device 5 detects that the supply voltage has increased in voltage supply system 1 and the actual intermediate circuit voltage $U_{ZK,ist}$ must be increased, and controls transistors 3.1 through 3.6 accordingly. The change in the output signal of operational amplifier 16 is proportional to the change in the supply voltage in the three phases L1, L2, and L3.

In another embodiment according to the present invention, the DC voltage of the intermediate circuit can also be changed in stages. As soon as the peak value of the rectified supply voltage $U_N$ is equal to intermediate circuit voltage $U_{ZK,ist}$, intermediate circuit voltage $U_{ZK,ist}$ is increased by a certain amount. If the peak value of the rectified supply voltage $U_N$ is less than intermediate circuit voltage $U_{ZK,ist}$ by a minimum amount, it can be reduced by a certain amount. An upper limit value, which is not to be exceeded by intermediate circuit voltage $U_{ZK,ist}$, and a lower limit value, below which it should not to drop, is predefined.

Figure 5:
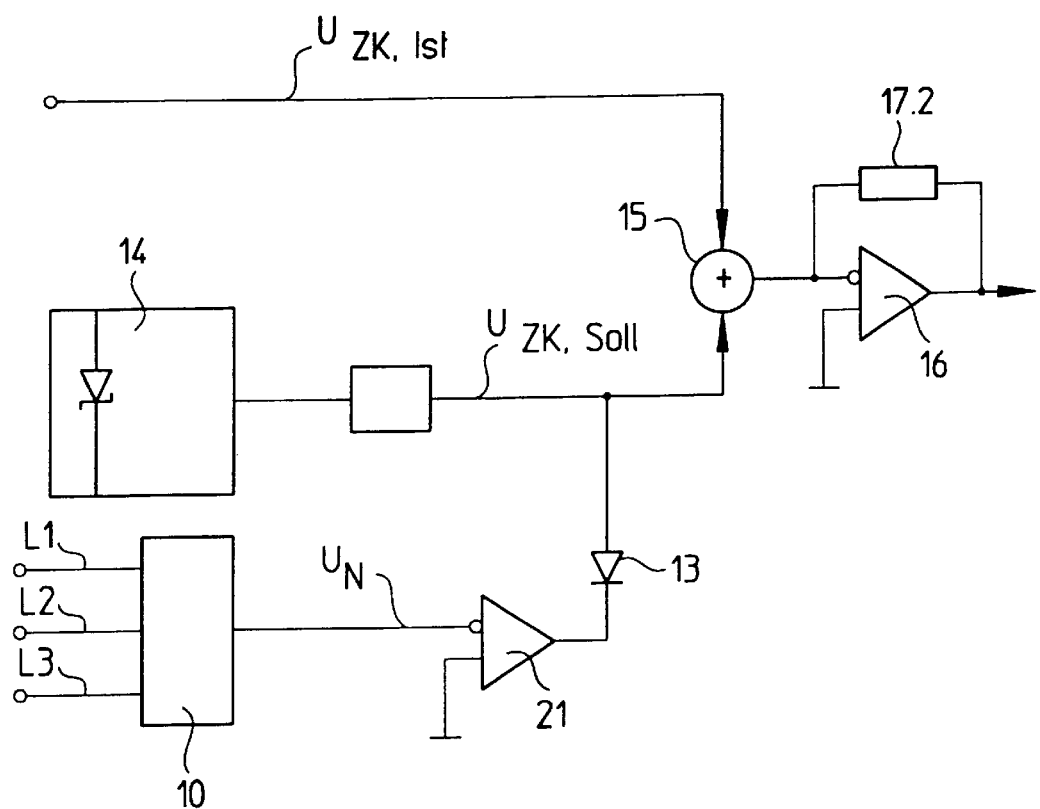
FIG. 5 shows another embodiment of the intermediate circuit voltage controller according to the present invention.

In yet another embodiment, the present invention provides a circuit arrangement as shown in FIG. 5. As in the circuit arrangement of FIG. 3, a rectifier 10, which generates a rectified voltage from the AC voltages of the three phases of the voltage supply system, is connected to conductors L1, L2, and L3 of the voltage supply system. The amplitude of rectified voltage UN is equal to the peak value of interlinked voltages of conductors L1, L2, and L3 of the voltage supply system. The DC voltage is supplied to an inverting input of an operational amplifier 21 having a gain of 1. Its output signal is supplied to a diode 13, which blocks as long as the supply voltage of conductors L1, L2, and L3 does not result in excessive currents in the converter, and conducts as soon as an overvoltage occurs in the voltage supply system. Therefore, the signal supplied by reference voltage generator 14 to adder is affected by the output signal of diode 13 whenever an overvoltage is present in the voltage supply system. If this is not the case, the negative setpoint value of the intermediate circuit voltage $U_{ZK,soll}$ is added, in adder 15, to the actual value of intermediate circuit voltage $U_{ZK,ist}$ by reference voltage generator 14, and thus the system deviation supplied to controller 16 for the intermediate circuit voltage is determined.

Figure 2:
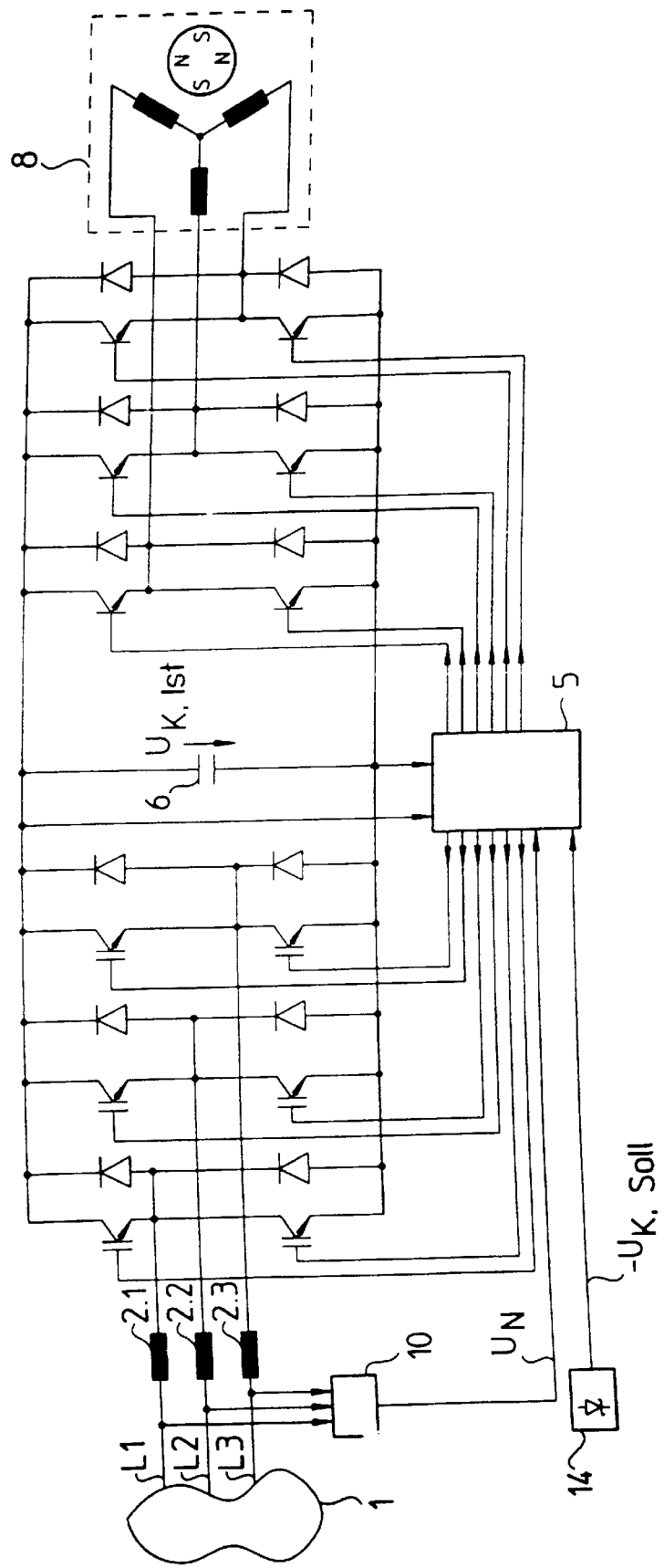
FIG. 2 shows an embodiment of a converter according to the present invention.

FIG. 2 shows the entire converter according to the present invention. It can be seen that a conventional converter may be used and supplemented by the controller according to the present invention as shown in FIG. 1. This controller can be implemented as an analog or digital circuit, since, unlike the converter, it does not have to process high currents for a load 8. In particular, in the digital implementation, it can be integrated in control unit 5. The converter according to the present invention allows almost any overvoltage to be converted, without any problems, into drive voltages and drive currents for the connected load 8. Thus different converter types for different domestic voltage supply systems 1, having only slightly different supply voltages, are no longer required, so that not only sensitivity to overvoltages in the voltage supply system is eliminated, but also the production and inventory keeping of converters can be significantly simplified. These considerable advantages are achieved using, for example, the controller arrangement shown in FIG. 1.

What is claimed is:

1. A method for operating a power converter to control a speed of a motor, comprising:

providing a supply voltage with a fixed frequency;

transforming the supply voltage into a rectified supply voltage;

providing an intermediate circuit rectified voltage from the rectified supply voltage;

controlling the intermediate circuit rectified voltage to a nominal value;

continuously comparing the rectified supply voltage with the nominal value and increasing the nominal value if the rectified supply voltage is equal or greater than the nominal value; and providing a supply voltage with variable frequency to the motor, the supply voltage being derived from the intermediate circuit rectified voltage.

2. A power converter for controlling the speed of a motor, comprising:

an input rectifier unit that transforms a supply voltage with a fixed frequency into a rectified supply voltage;

an intermediate circuit unit that provides an intermediate circuit rectified voltage from the rectified supply voltage;

a control unit that controls the intermediate circuit rectified voltage to a nominal value;

a comparator unit that continuously compares the rectified supply voltage with the nominal value and increases the nominal value if the rectified supply voltage is equal or greater than the nominal value; and an output inverter unit that provides a supply voltage with variable frequency to the motor, the supply voltage being derived from the intermediate circuit rectified voltage.

* * * * *